United States Patent [19]

Borcoman

[11] 4,269,577

[45] May 26, 1981

[54] PRODUCTION LINE FOR THE MANUFACTURE OF CONCRETE ELEMENTS

[76] Inventor: Mircéa Borcoman, 8, rue des Dardanelles, 75017 Paris, France

[21] Appl. No.: 56,624

[22] Filed: Jul. 11, 1979

[30] Foreign Application Priority Data

Jul. 17, 1978 [FR] France ............................... 78 21167

[51] Int. Cl.³ ............................................. B29C 25/00

[52] U.S. Cl. ........................................ 425/62; 425/63; 425/68; 425/93; 425/104; 425/270; 425/272; 425/273; 425/275

[58] Field of Search ........................ 425/62, 63, 68, 67, 425/70, 71, 93, 94, 99, 104, 508, 123, 134, 588, 259, 270, 272, 273, 275, 360, 424, 432, 441

[56] References Cited

U.S. PATENT DOCUMENTS

| | | | |
|---|---|---|---|
| 1,306,620 | 6/1919 | Pelton | 425/432 |
| 2,835,016 | 5/1958 | Dixon | 425/424 |
| 2,901,808 | 9/1959 | Muehleck et al. | 425/432 |
| 3,732,052 | 5/1973 | Gunia | 425/432 |
| 3,994,657 | 11/1976 | Minegishi | 425/432 |
| 4,005,963 | 2/1977 | Borcoman | 425/424 |

FOREIGN PATENT DOCUMENTS

| | | |
|---|---|---|
| 209411 | 3/1908 | Fed. Rep. of Germany . |
| 376337 | 3/1923 | Fed. Rep. of Germany . |
| 477368 | 6/1929 | Fed. Rep. of Germany . |
| 2043071 | 3/1972 | Fed. Rep. of Germany . |

*Primary Examiner*—Donald J. Arnold

[57] ABSTRACT

A production line for the manufacture of (unreinforced, reinforced or prestressed) concrete comprising concrete casting means, a circuit for hardening it and means for removing the hardened elements. It includes a chain of floats adapted to be moved in a moat of liquid and means for placing the concrete elements which have just been cast, on said floats, which by moving in the moat, transport the concrete elements through the hardening circuit, means being provided to bring back the floats to the concrete casting means. The installation is applied in the manufacture of piles, posts for electric cables, slabs, beams, panels and curbs.

22 Claims, 13 Drawing Figures

PRODUCTION LINE FOR THE MANUFACTURE OF CONCRETE ELEMENTS

BACKGROUND OF THE INVENTION

1 Field of the Invention

The invention relates to a production line for the manufacture of unreinforced, reinforced, or prestressed concrete elements such as piles, posts notably for electric cables, slabs, beams, panels and curbs, of the type which comprise means for casting and compacting concrete in molds; a circuit for hardening the concrete elements which have just been cast, and means for removing the hardened elements.

2. Description of the Prior Art

Two principal groups of manufacturing installations of this type are known: one of which uses immediate unmolding and the other which ensures the hardening of the concrete in the molds.

Manufacturing installations of the first group with immediate unmolding, include, in their hardening circuit, heating installations, with staged chambers, which necessitate a relatively high expenditure of power to ensure on the one hand, the desired conditions of humidity and temperature and on the other hand, the routing of the concrete elements between the entrance and the exit of the hardening circuit.

The manufacturing installations belonging to the second groups, with hardening of the concrete in the molds, necessitate considerable lifting and handling means for the movement of the molds between the work stations as well as a relatively high expenditure of power for the movement of these filled molds, over a portion of their course, by the concrete elements.

In addition, for the manufacturing lines belonging to the two groups, there exists a non-negligible percentage of rejects, due notably, to hardening accidents, and generally, the quality of the finished products is mediocre. In addition, the diversification of the production of such manufacturing chains is difficult to accomplish.

It is an object of the invention to provide a production line for concrete elements which responds to the various exigencies of practice better than hitherto and notably such that it no longer presents or to a lesser degree, the above-mentioned drawbacks. It is a further object of the invention to provide a production line for the manufacture of concrete elements of an extended range, even of large mold, whilst satisfying the various exigencies of cost-price, of productivity and of quality more adequately.

Other features and advantages of the invention will be apparent from the description which follows.

GENERAL DESCRIPTION OF THE INVENTION

According to the invention there is provided a production line for the manufacture of concrete elements of the previously defined type which is characterized by the fact that it comprises a chain of floats adapted to be moved in a moat of liquid (notably water or oil) and means for placing the concrete elements which have just been cast, on said floats, which floats by being moved in the moat, transport the concrete elements from the casting means to the removal means by passing the concrete elements through the hardening circuit, means being provided to bring back the floats to the means for casting the concrete.

In a first embodiment, the liquid moat or tank is arranged so that the circuit followed by the floats in this moat is an open circuit comprised between the concrete casting means and the removal means, and the means for bringing back the floats to the casting means are constituted by handling means such as notably overhead racks, cranes or pulley block systems.

In another embodiment, the liquid moat is arranged so that the circuit followed by the floats forms a closed loop, passing through the casting means and the removal means, the means for bringing back the floats to the casting means being constituted by a portion of the moat itself.

The circuit can form a loop in a horizontal plane, the moat then having two adjacent compartments in which the floats are moved in opposite directions.

The circuit may form a loop in a vertical plane, the moat being a single tank and the paths, in opposite directions, effected by the floats between the casting means and the removal means or reversely, being superimposed.

The movement of the floats in the moat can be carried out, notably by floating, so that the elements rest above the level of the liquid, the hardening circuit being constituted by at least a portion of the moat, notably equipped with suitable heating means for accelerated hardening.

In a modification, the floats, for a portion at least of their displacement corresponding to the traversal of the hardening circuit, are immersed with the concrete elements that they support, in the liquid of the moat; this liquid is progressively heated along the moat.

Advantageously, the floats have a volume determined according to their weight and the weight of the heaviest and lightest concrete elements to be transported, so that during the floating or immersion of the floats in the liquid of the moat, the gravitational force due to the heaviest products is equal to the lifting force obtained with the lightest products.

When the concrete casting and compacting means are arranged to ensure unmolding of the elements immediately after their casting, the floats are formed by "board-floats" on which the bare elements are deposited during the immediate unmolding.

When the concrete elements rest in the molds during hardening, the floats are formed by "mold-holding floats" on which the molds are fixed, and these "mold-holding floats" are displaced along a looped circuit so as to cause the molds to pass not only through the hardening circuit, but also through the various work stations (casting of the concrete, unmolding, cleaning of the molds).

The floating capacity of the floats can be modified, according to requirements, either by means of a weight, or by modifying their equilibrium by the introduction into, or the removal from the, floats of a liquid, notably the liquid of the moat.

The liquid moat may be sunk into the ground, half sunk or overhead; it is constructed so as to ensure, on the one hand, good fluid-tightness and on the other hand, effective heat insulation when heating means are used for the accelerated hardening of the concrete.

By means of the chain of floats, the movement of the concrete elements through the hardening circuit is effected with minimum power consumption. The closed container constituted by the liquid moat enables heat energy losses to be reduced to the minimum in the case of an accelerated hardening circuit with heating means inside the moat.

Other advantages of the invention will become more apparent from the detailed description given below with reference to the accompanying drawings, but which is given purely by way of non-limiting illustration.

DESCRIPTION OF PREFERRED EMBODIMENTS

Figure 1:
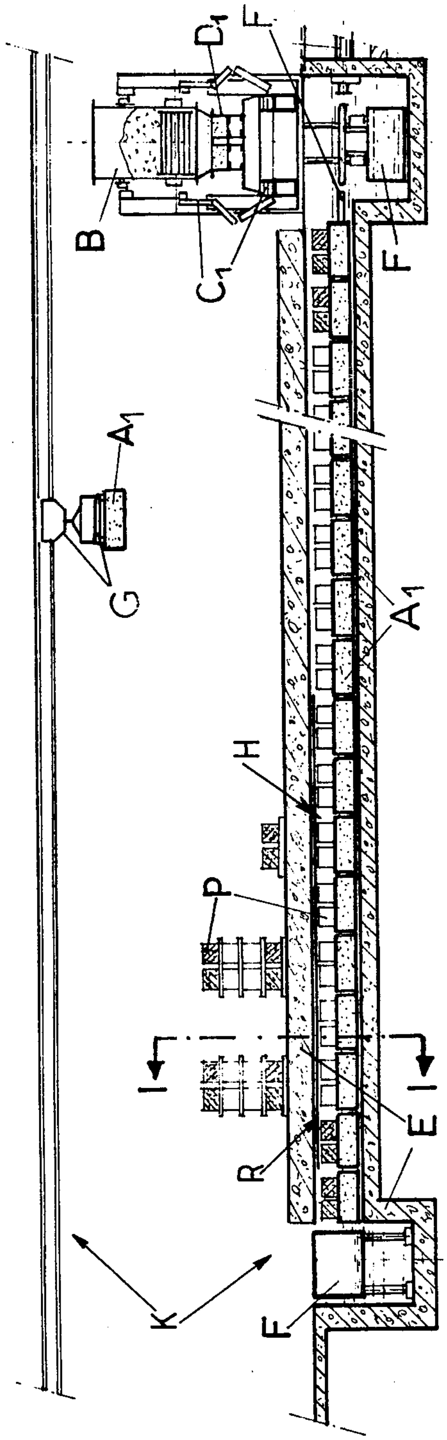
FIG. 1, of these drawings, is a diagrammatic longitudinal section of an embodiment of a production line according to the invention for the manufacture of concrete elements, with immediate unmolding by means of a device for tilting through 180°, in which the movement of the floats is ensured by floating throughout the length of the liquid moat.

Referring to the drawings, several types of production lines can be seen for a wide range of elements or products "p" of unreinforced, reinforced or prestressed concrete.

Each production line for concrete elements comprises: means B for casting and compacting the concrete in the molds or batteries of molds D1, D2, D4; a circuit H for the hardening of the concrete elements which had just been molded and means K for the removal of the hardened elements.

According to the invention, the production line comprises a chain of floats formed either by board-floats A1 (FIGS. 1 to 6 and 10 to 12) or by mold-holder floats A2 (FIGS. 7 to 9 and 13) adapted to be moved in a moat or tank E of liquid, generally a water tank or possibly an oil tank; this moat E may or may not be equipped with heating means R for accelerated hardening.

Means C, F are provided to place the concrete elements p, which have just been cast, on said floats A1 and A2; these floats by moving in the moat E transport the concrete elements p from the casting means B to the removal means K by passing the concrete elements through the hardening circuit H. The floats are moved head-to-head, and/or tail-to-tail.

Means, formed by handling means G (FIGS. 1, 3) or by the moat E itself (FIGS. 5 to 8) are provided to bring back floats A1, A2 to the concrete casting means B.

Figure 3:
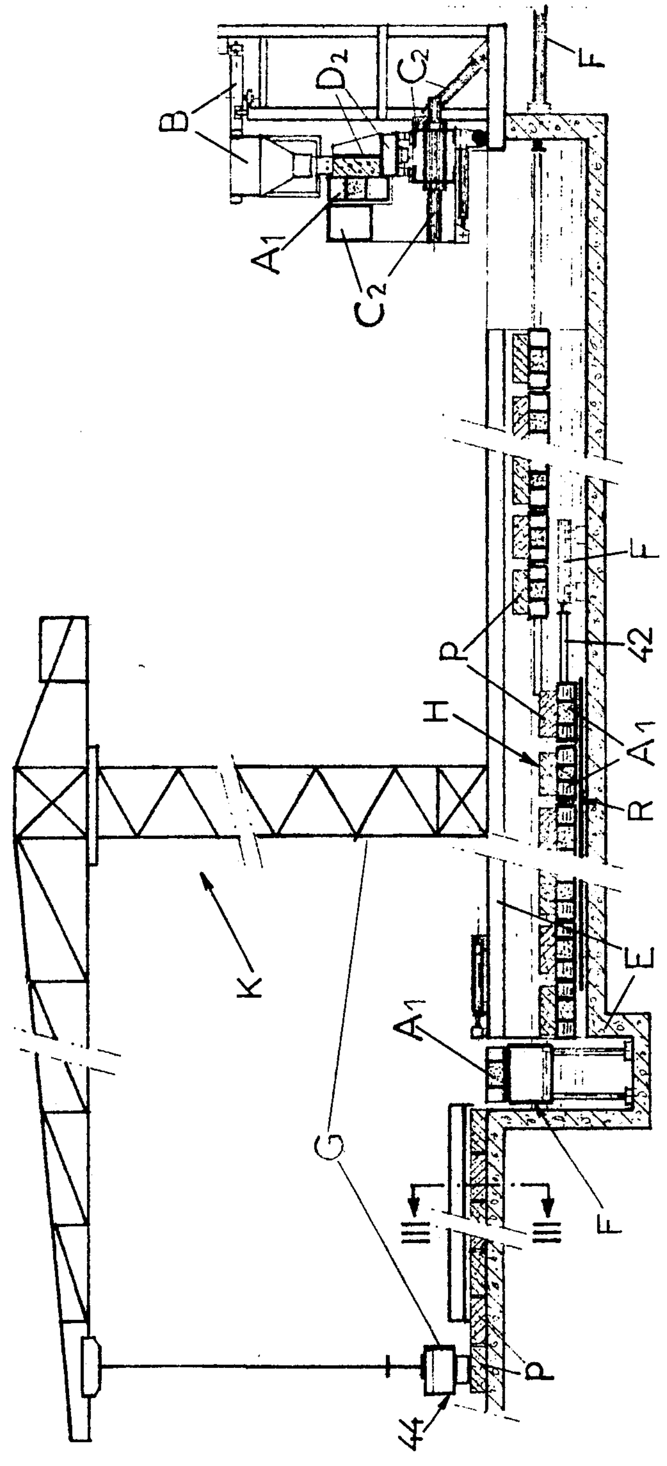
FIG. 3 is a diagrammtic longitudinal section of an embodiment of a production line, with immediate unmolding by means of a device for tilting through 90°, in which the movements of the floats is first detected by floating during the presetting time of the concrete, and then by immersion in the liquid of the moat.

The liquid moat E is arranged, according to the embodiments of FIGS. 1 and 3, so that the circuit followed by the floats A1 in this moat is an open circuit comprised between the casting means B and the removal means K. The means for bringing back the floats A1 to the casting means B are constituted by handling means G such as overhead racks (FIG. 1), cranes (FIG. 3) or block and tackle devices.

Figure 7:
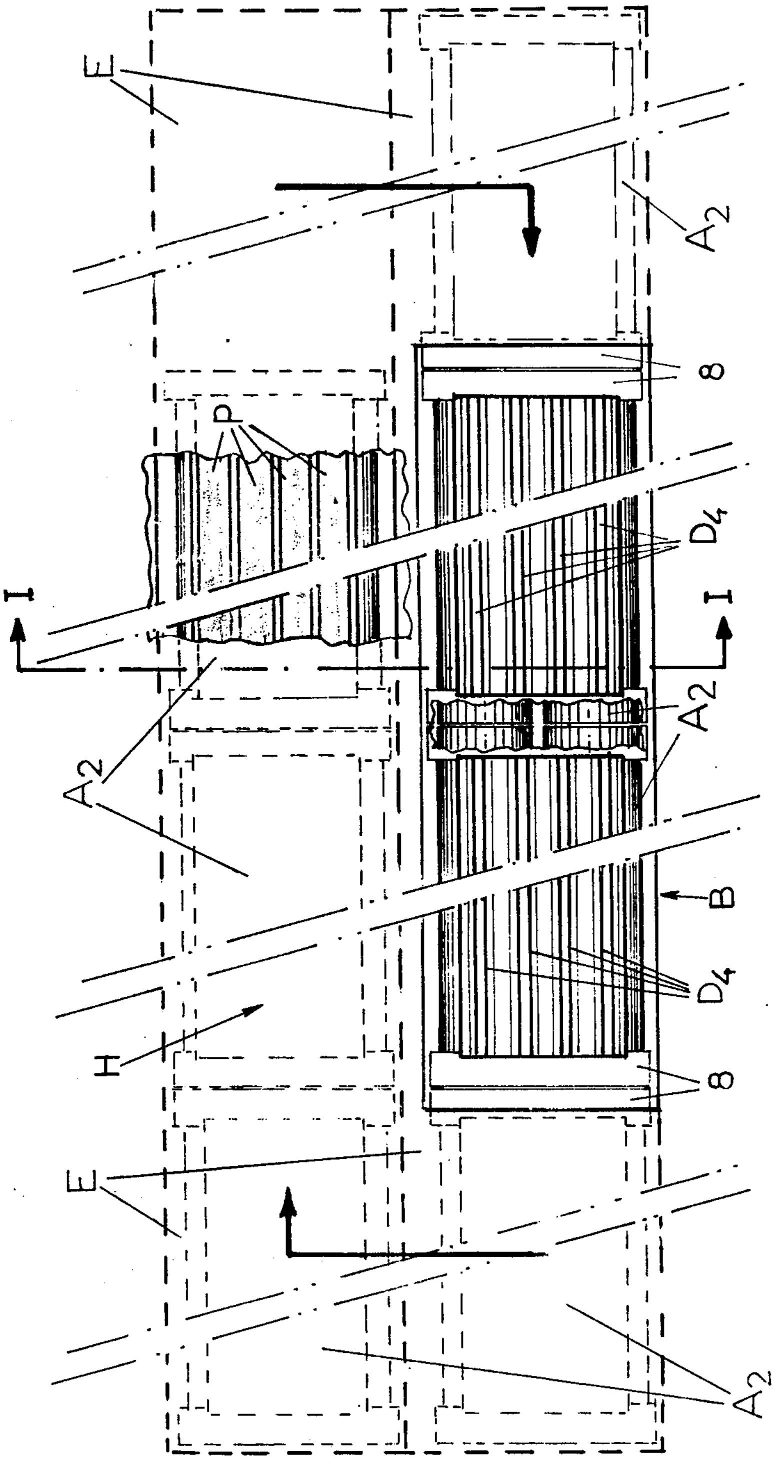
FIG. 7 is a plan view with portions removed, of a production line in which the hardening of the concrete elements is effected in molds, the movement of the floats being carried out in a circuit looped in a horizontal plane, the liquid moat having two adjacent compartments, the movement being effected by floating in the first compartment of the moat and by immersion in the liquid for the adjacent compartment.
Figure 8:
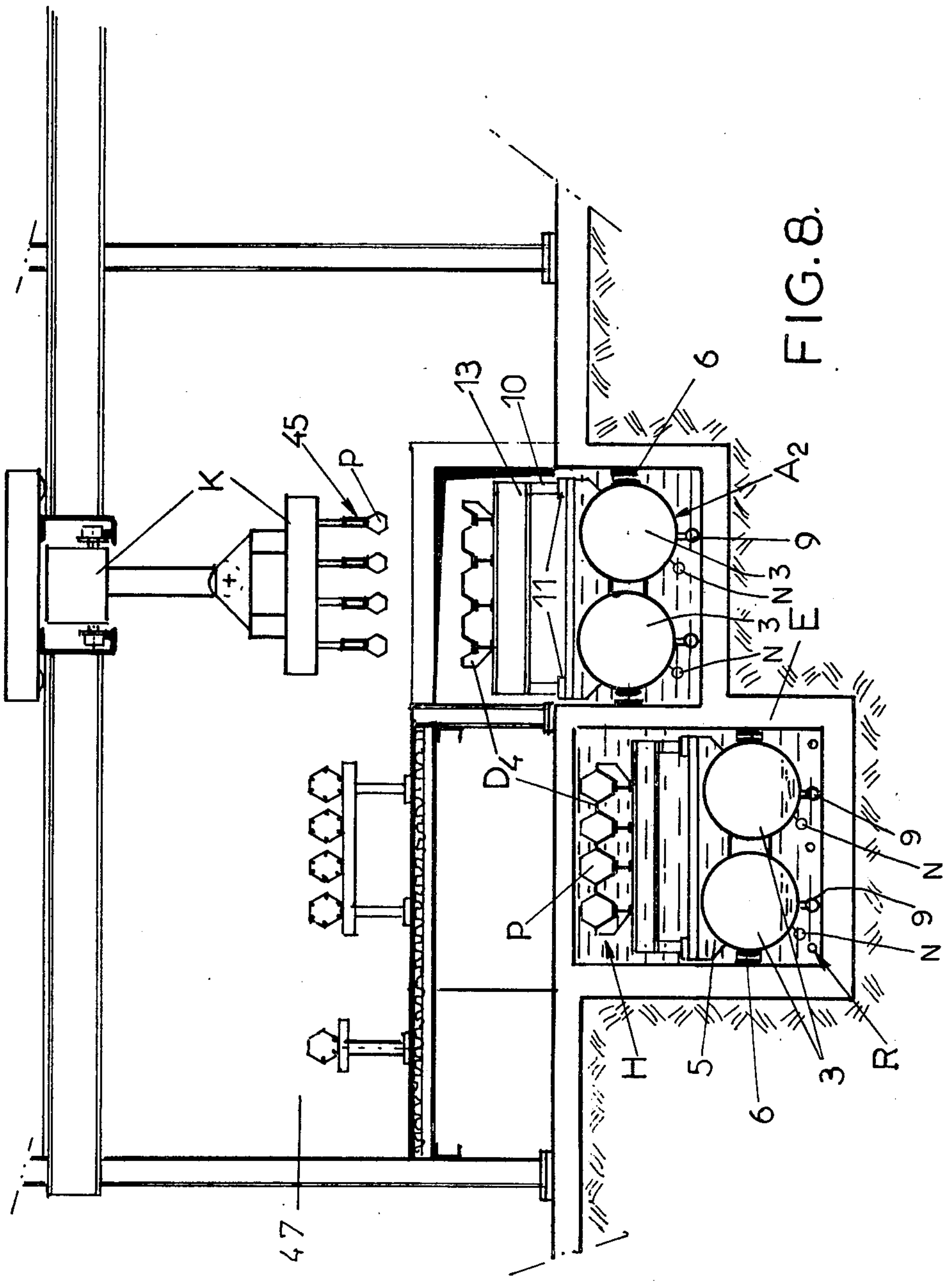
FIG. 8 is a cross-section along the line I—I, of FIG. 7.
Figure 9:
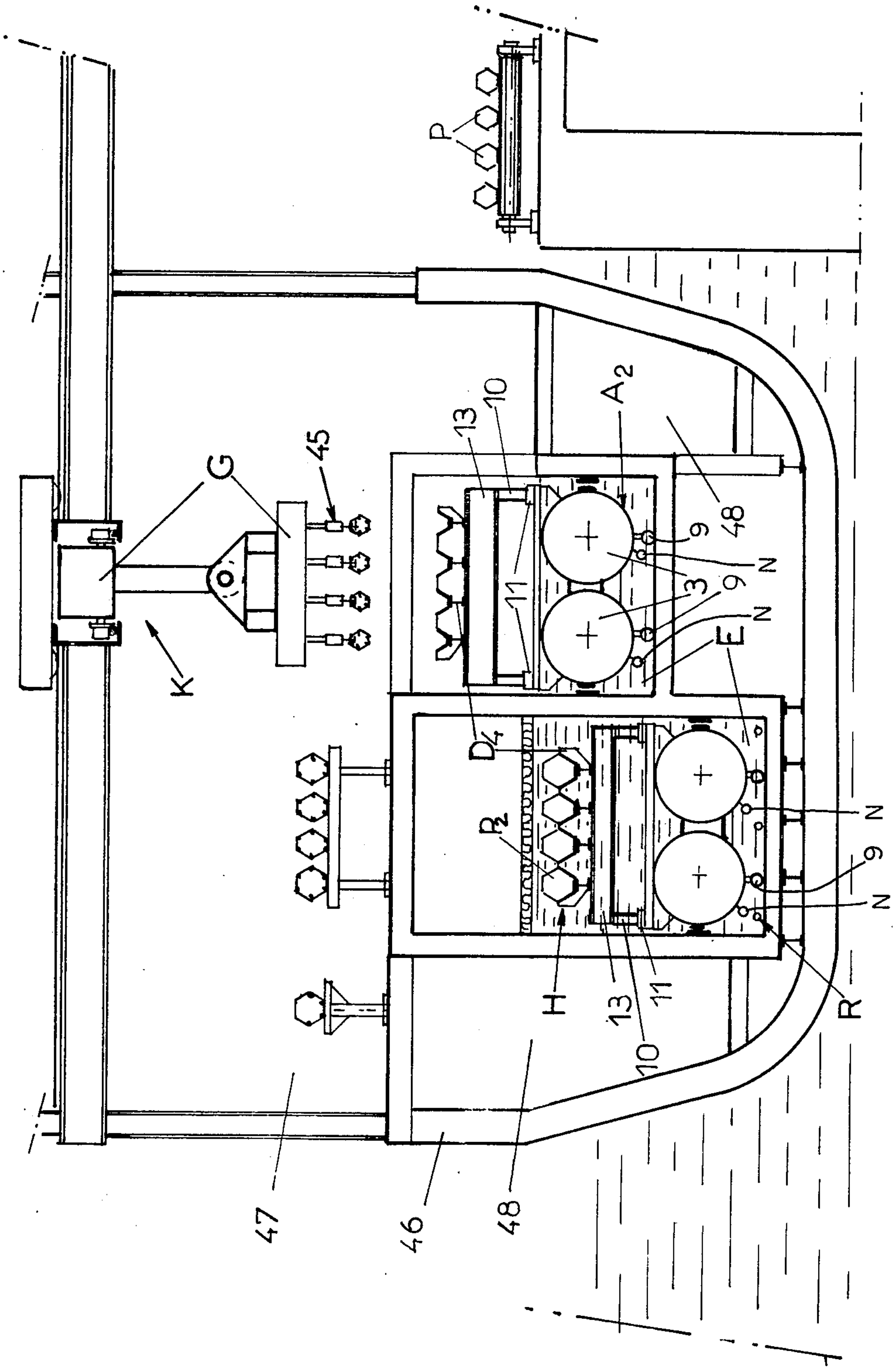
FIG. 9 is a cross-section illustrating the mounting of the production line of FIGS. 7 and 8 in a floating hull of a boat.

In the embodiment of FIGS. 7 and 8, the liquid moat is arranged so that the circuit followed by the floats A1, A2 is a looped or closed circuit passing through the casting means B and the removal means K, the means for bringing back the floats to the casting means being constituted by a part of the moat E itself.

Figure 5:
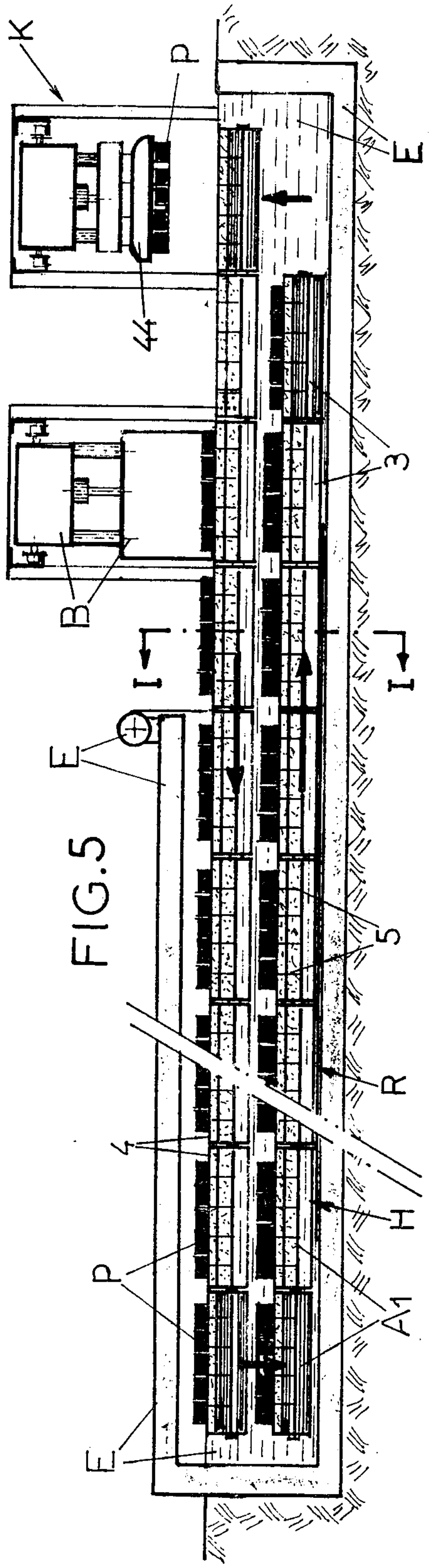
FIG. 5 is a diagrammatic longitudinal section of a production line with immediate unmolding, in which the unreinforced concrete elements are deposited directly on the floats, the latter describing, in the moat, a closed loop circuit in the vertical plane with floating in the forward direction and immersion in the liquid for the return.
Figure 6:
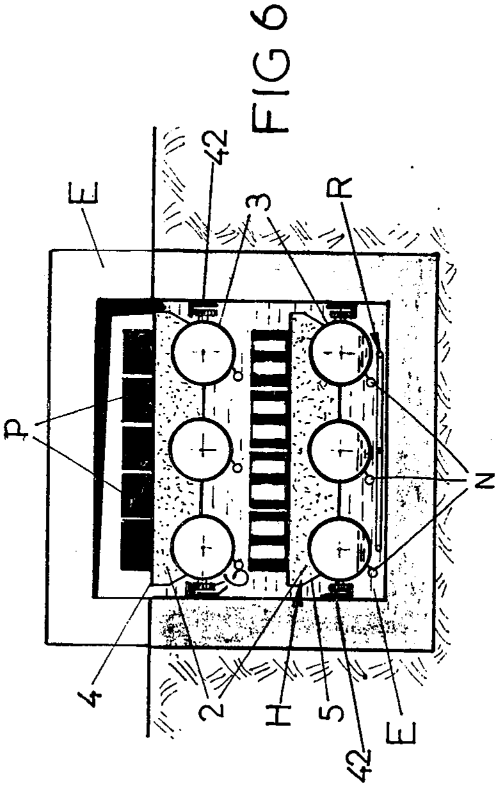
FIG. 6 is a cross-section along the line I—I, of FIG. 5.

In the case of FIG. 5, the circuit is looped in a vertical plane; the moat E includes a single compartment and the paths effected by the floats in reverse direction are superimposed.

According to the embodiment of FIGS. 7 and 8, the circuit is looped in a horizontal plane and the moat E includes two adjacent compartments as is clearly seen in FIG. 8.

Figure 10:
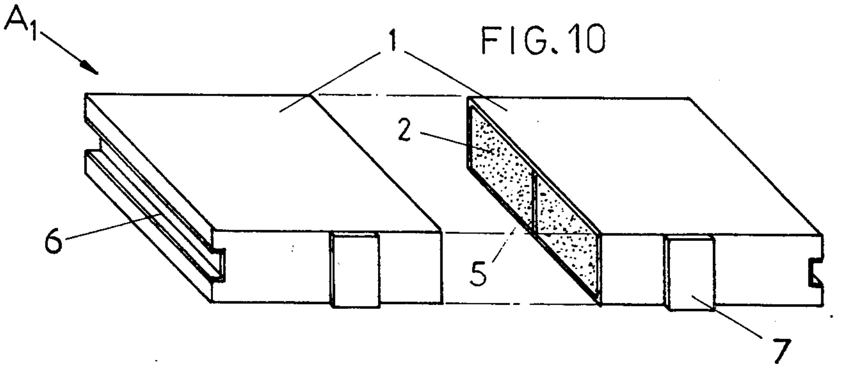
FIG. 10 is a perspective view, with a part cut through, of a "board-float" formed by a casing filled with a material, notably a hydrophobic material.

In the case of immediate unmolding of the concrete elements p, just after the casting of the concrete, the floats are constituted by "board-floats" A1 (FIGS. 1 to 6 and 10 to 12). These board-floats may be arranged in the form of a casing 1 (of sheet metal, polyester, etc,) having the shape of a parallelepiped, which casing is rendered fluid-tight by welding, or notably by the injection of a hydrophobic and light weight material 2 (FIG. 10). In a modification, these "board-floats" A1 are formed by means of one or several buoyancy elements (FIGS. 11 and 12) such as tubes, pipes, hollow sectional elements, etc., connected to a support tray 4 for the products or elements, through mounting parts 5. The "board-floats" A1 are provided on their side with guide parts 6 (grooves, rollers, etc.) adapted to cooperate with rails 42 extending in the longitudinal direction of movement of the floats, on the walls of the moat E; buffer parts 7 are provided at the ends of the boards A1 transversal with respect to the direction of movement.

Figure 11:
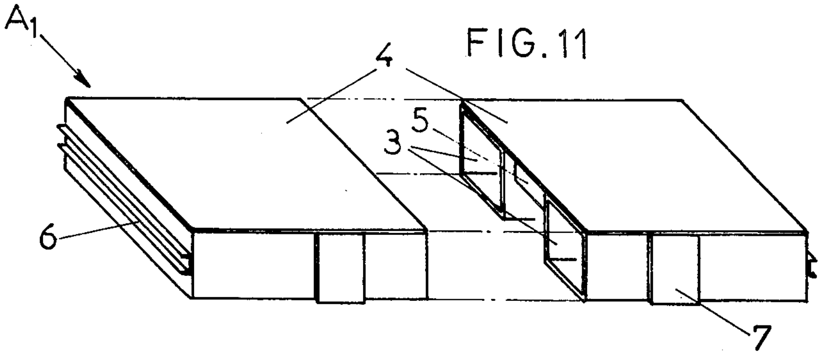
FIG. 11 shown, similarly to FIG. 10, a "board-float" formed principally by means of hollow sectional elements.
Figure 12:
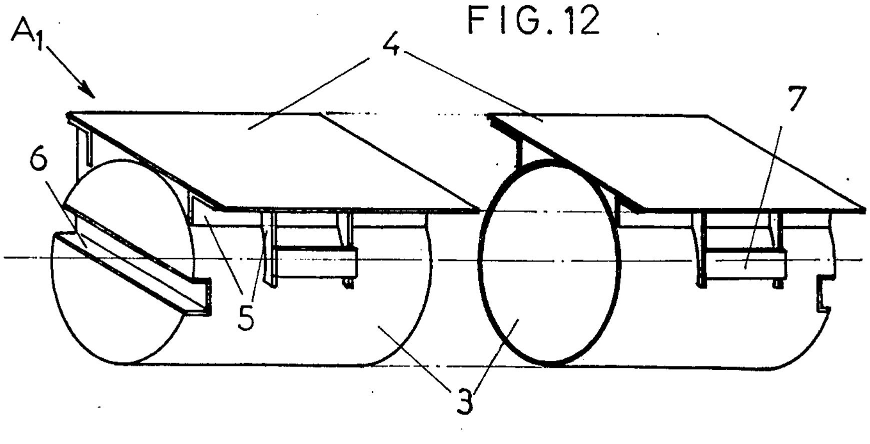
FIG. 12 shows, similarly to FIG. 10, a "board-float" formed principally by means of a tube.
Figure 13:
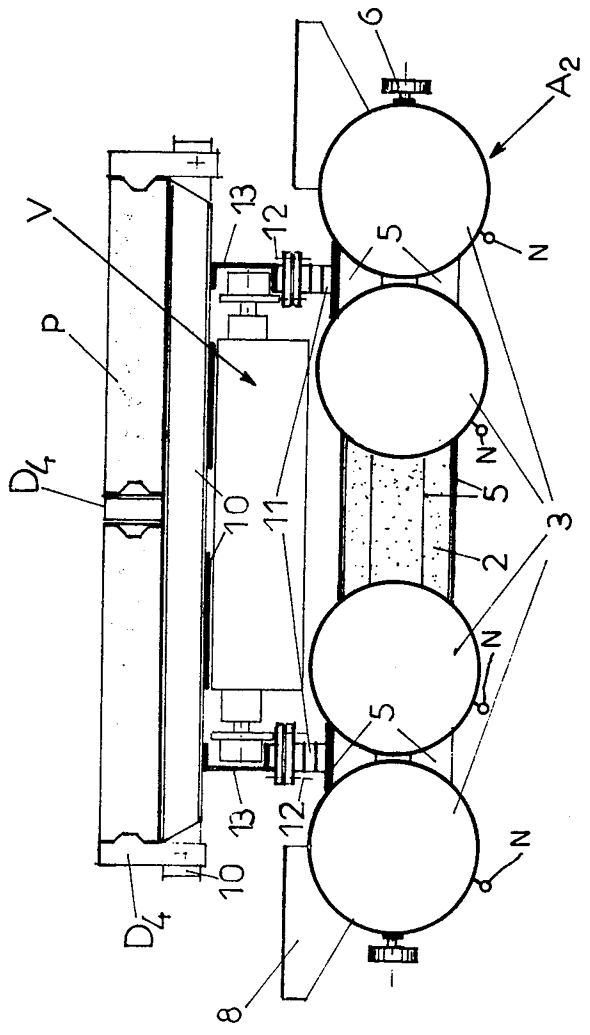
FIG. 13, lastly, is a cross-section of a mold-holder float formed by means of several tubes.

In certain cases, it is possible to combine the two embodiments illustrated notably by FIGS. 10 and 11.

In the case where the concrete elements p remain in the molds, during hardening, the floats are formed by mold support floats A2 (FIGS. 7 to 9 and 13). They include buoyancy elements 3 and parts similar to those described previously and denoted by the same reference numerals 2, 5, 6 and 7. The floats A2 include in addition, one or several longitudinal or transversal operating platforms 8; if necessary bearing rollers 9 (FIGS. 8 and 9) may be provided below the floats A2. These floats are provided with mold supports 10 mounted on the bed of the float through support parts 11, notably with elastic studs so that it is possible to vibrate the support 10 to compact the concrete contained in the molds, by filtering the vibrations towards the bed of the float. Advantageously, the vibration means V (FIG. 13), shown diagrammatically, are arranged to be coupled, during the vibration, to the mold support 10. These vibration means V occupy a fixed position in the moat E whereas the floats A2, and hence the supports 10, move in the longitudinal direction. Receiving parts 13 (FIG. 13) for example formed by U sectional elements are provided beneath the supports 10. On the step-by-step advance of the float A2, the vibration means V are disengaged from the support 10 and rest by rotary rollers on the parts 13. It is understood that on the advance by one step equal to the length of the float A2, the vibration means V, held fixed in the longitudinal direction of the moat E, notably by a cable attached to one end of the moat, pass below the float immediately following.

Advantageously, the volume of the floats A1, A2 is calculated as a function of their weight and of the heaviest and lightest weights of the products to be manufactured, so as to ensure, during immersion of the float provided with the bare products, a gravitational force, obtained when the float is loaded with the heaviest products, whose amplitude is equal to that of the lifting force obtained when the float is loaded with the lightest products. Economic routing of the floats in the hardening circuit is thus ensured.

In other words, in the case of the heaviest products, the Archimedes thrust only partially compensates for the weight of the heaviest products and there subsists a gravitational force oriented downwards. In the case of the lightest products, the Archimedes thrust is greater than the weight of the product and a lifting force results therefrom.

The rails or guiding slideways 42 of the floats are thus subjected to reduced forces, notably in the parts of the moat where the floats are entirely immersed. Means, such as for example remote controlled electrovalves N, may be provided on the floats to modify the equilibrium of these floats by the introduction into the floats of a liquid, notably the liquid of the moat. These means enable also the evacuation from the floats of the liquid, for example, by the admission of compressed gas into the float to drive out the liquid.

The concrete casting and compacting means B (FIGS. 1 to 4) are conventional and include a distributing hopper, notably provided with a delivery regulating drum 15, and with a finishing rule.

Figure 4:
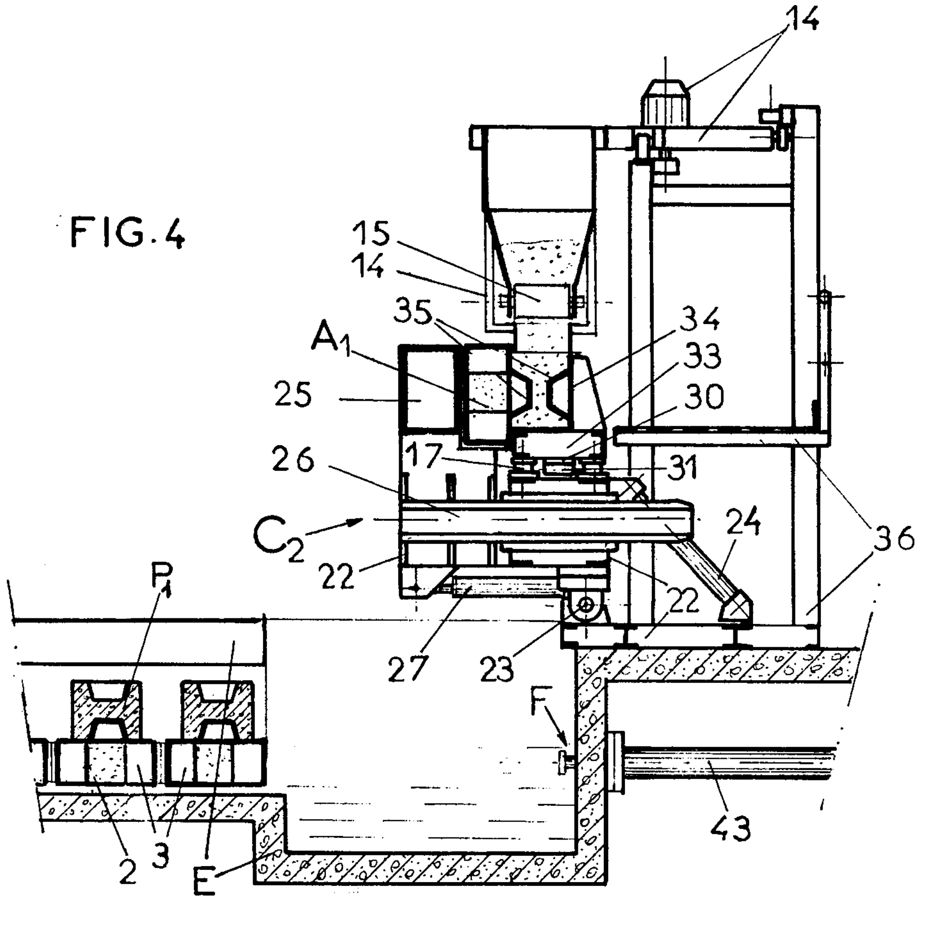
FIG. 4 shows, on a larger scale, the means for casting the concrete and for unmolding of the embodiment of FIG. 2, adapted for the manufacture of electrical posts.

Unmolding means and means for placing the concrete elements p on the floats may include tilting means C arranged either to ensure tilting to 180° (FIGS. 1 and 2) or tilting to 90° (FIGS. 3 and 4).

Figure 2:
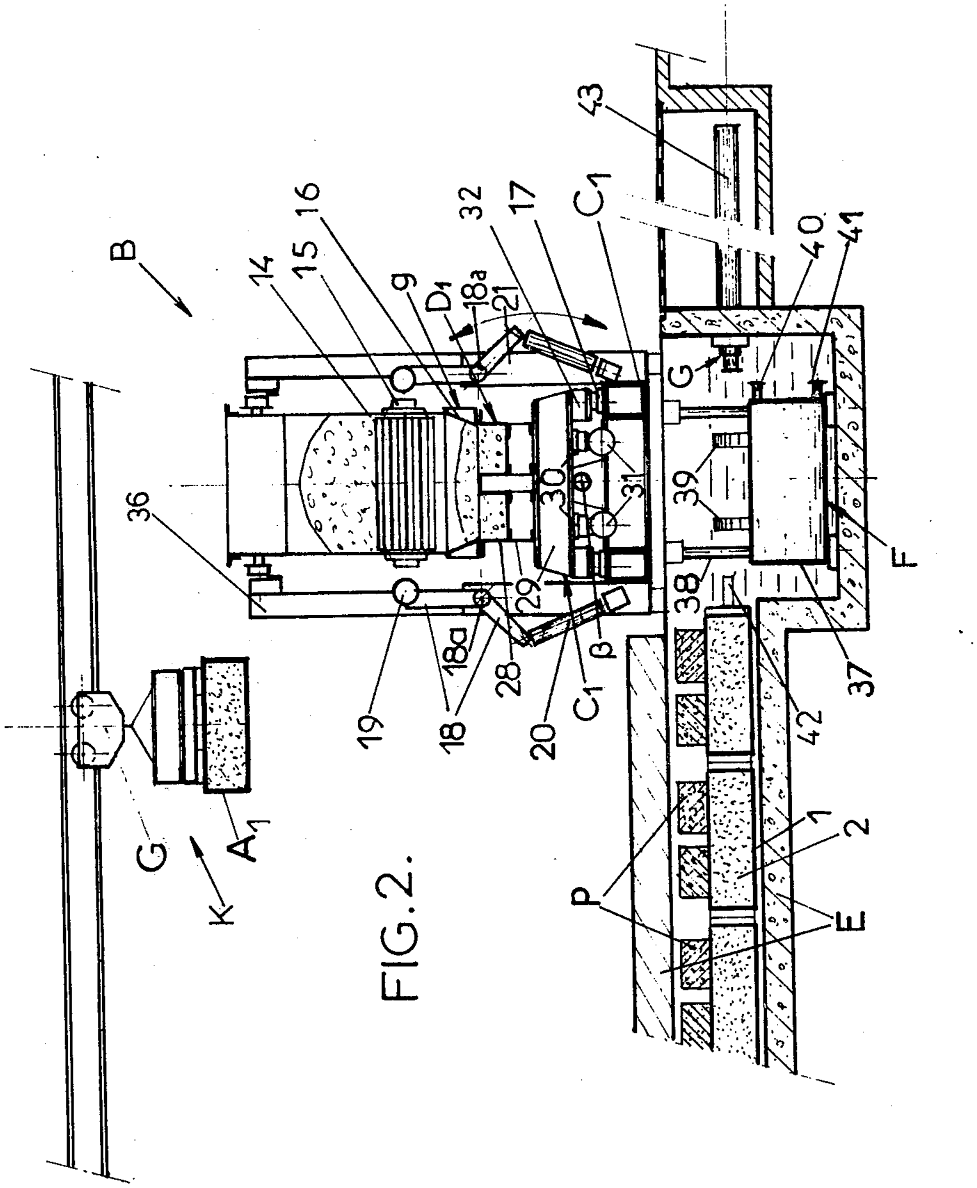
FIG. 2 shows, on a larger scale, means for casting the concrete and for unmolding of the embodiment of the production line of FIG. 1.

In the case of tilting to 180°, the tilting means comprise a frame C1 adapted to tilt by 180° around an axle $\beta$ (FIGS. 1 and 2). The frame C1 is provided with parts 17, notably elastic, for the support and fixing of the molds D1. Means such as a jack, are provided to actuate the tilting of the frame C1 around the axis $\beta$. A device is in addition, provided to grip the "board-floats" A1 against the molds D1; this device comprises bent lever arms 18, pivoted at 18*a* and provided with two longitudinal contact parts 19 adapted to urge the boards A1 against the molds; the lever arms 18 are connected to a system of oscillating jacks 20 pivoted to posts 21 fixed to the frame C1; the pivots 18*a* are also provided on the posts 21.

In the case of tilting to 90°, the tilting means comprise a frame C2 (FIGS. 3 and 4) used notably for the manufacture of elements of considerable length whether of U-shaped or T-shaped cross-section. This frame C2 includes a framework 22, rotatable around an axis of rotation 23; two jacks 24 are provided to actuate the tilting of the frame C2. A device is also provided for gripping the "board-floats" A1 against the molds and for lowering these boards. This gripping and lowering device comprises a longitudinal support 25, guides 26 for the movements of the support 25, and two jacks 27 actuating these movements. For casting, the "board-float" A1 is gripped in the frame, so as to form a part of the mold, as seen in FIG. 4. After tilting of the frame C2 to 90° with respect to the position of FIG. 4, the release is effected with the jacks 27, which causes a vertical descending movement of the support 25 and of the "board-float" A1 in the moat E; at the same time, immediate unmolding occurs and the concrete elements p are supported by the board A1.

The molds or batteries of molds D1 (FIGS. 1 and 2) include one or several sheet metal shelves 28, a mounting framework 29, provided with plates 30 for the engagement of the vibrators 31 and with support shims 32 on the studs 17.

In the case of tilting to 90° (FIGS. 3 and 4) the mold C2 is constituted by a bottom 33, a wall 34 and the "board-float" A1 itself, placed parallel to the wall 34. In certain cases, dismountable shells 35 are fixed to the wall 34 and/or to the "board-float" A1.

The tilting frame C1, C2 equipped with molds and the concrete distributing and smoothing device are mounted on a common metal framework 35, with all the hydraulic and electrical connections so as to form an independent module or "casting-unmolding head" which can be transported and mounted in a very short time.

In the case of production lines where the hardening of the concrete elements takes place in molds D4 (FIGS. 7 to 9 and 13), these molds are constituted conventionally, independently or in batteries.

The water moat E (FIGS. 1 to 9) is arranged so as to ensure the fluid-tightness and good insulation. The heating means R of this moat, for the hardening circuit, differ according to the type of production line.

For the type of production line in which the floats, supporting the concrete products, are moved by buoyancy, so that the concrete products remain always above the level of the liquid, it is possible to heat the space of the tank situated above the liquid with the aid of conventional means such as steam, or to proceed by spraying with hot water.

For production lines in which the concrete elements are immersed in the liquid of the moat, during the passage through the hardening circuit H (FIGS. 3 to 8), means R are provided for heating the liquid of the moat, so as to ensure an increase in temperature of this liquid along the moat. These heating means can include a superheated water distributing installation provided with connectors, arranged along the moat, and provided with electrovalves for the regulation of the flow rate, according to the temperature desired, so as to obtain the optimum temperature curve. However, the heating of the liquid of the moat may be ensured by other means such as steam, electrical resistances or any other suitable heating means. In certain cases, it is possible to use hot water from a natural spring or industrial recovery water. By using for the recovery of the cooled water a system parallel with that of the supply and placed in the same channel, an increased economic efficiency is obtained.

Means F (FIGS. 1, 2 and 3) are provided to ensure the lowering, the immersion and the extraction of the board-floats A1, provided with the bare products. These means F include either mechanical lifts, or float lifts 37, provided with a sliding mechanism 38, with guide parts 39 for the board-floats and with two connectors, one 40 for filling the lift float 37 with liquid and the other 41 for removing liquid from the lift float 37. The filling of this lift float 37 by liquid causes its lowering into the moat E, whilst the evacuation of the liquid from this lift, causes its ascent in the liquid of the moat.

The means for moving floats A1 or A2 are constituted by thrust devices 43, notably formed by synchronized jacks, ensuring a step-by-step advance of all of the floats in abutment one against the other. The floats are guided by rails or slideways 42 (see notably FIG. 2).

For production lines in which the concrete elements are immersed in the liquid, there are used for the longitudinal and transverse displacements of the floats, conventional displacement means such as jack thrust devices described previously. For vertical displacements of the floats designed to cause immersion of these floats or their ascent to the surface of the liquid, there are used as previously explained, valves to introduce or remove liquid from the floats.

The means K (FIGS. 1 to 9) for the removal of the concrete elements from the chain may be merged, in certain cases (FIGS. 1 and 3) with return means G for the "board-floats" A1 to the casting means. These means K of conventional type (bridge cranes, cranes, electro-block and tackle systems, etc.) are notably provided with suction apparatus 44 (FIGS. 3, 5) or with an electromagnet 45 (FIGS. 8 and 9) for the handling of steel reinforcements.

The production lines of the invention may be fixed or may be mounted in a shell 46 (FIG. 9) of a boat in order to constitute a floating factory. This shell 46 is then equipped with a concrete hopper, with reinforcement workshops 47 for the deposit of material 48 and other auxiliaries.

In all cases, the hardening can be natural or accelerated by heating means.

It will be noted that the concrete casting means B, in the case of the production line of FIG. 5, are arranged to permit immediate unmolding by posing the concrete elements directly on the floats A1.

The production lines according to the invention enable products of good quality to be produced, even if they are of large size, with a reduced power consumption. In fact, the floats on wich the concrete elements are placed during their hardening are supported, by the liquid of the moat, over the whole of their surface. The deformations of the floats due to the load constituted by the concrete elements are reduced during the hardening which is thus carried out under good conditions. This remains true, even if elements of large size such as electrical posts are concerned whose lengths can reach 10 meters or more.

The thermal losses are reduced due to the fact that the moat E can be heat insulated under good conditions, this moat only communicating with the outside at one or both of its ends, through relatively small apertures.

I claim:

1. A manufacturing line for the manufacture of non-reinforced, reinforced, or pre-stressed concrete such as piles, posts, slabs, beams, panels, curbs and the like, conprising:

casting means for casting and compacting concrete in the moulds, a hardening circuit for hardening the concrete elements which have been cast by the casting means, a removal means for removing the hardened concrete elements from the hardening circuit, a moat adapted to be filled with a liquid, a chain of floats movable along said moat, means for placing on the floats the concrete elements which have just been cast by the casting means, said moat being positioned to convey the said moulded concrete elements from said casting means, through said hardening circuit and to said removal means, returning means for conveying the floats from said removal means back to said casting means, and means for varying the equilibrium of each float in the liquid by introducing liquid into the float or removing liquid therefrom.

2. A production line according to claim 1, wherein the means for changing the equilibrium of each float comprises means for introducing the liquid of the moat into the float or removing said liquid therefrom.

3. Manufacturing line according to claim 1, wherein the moat of liquid is arranged so that the circuit followed by the floats in this moat is an open circuit between the concrete casting means and the removal means, and wherein the returning means for bringing back the floats to the casting means are constituted by handling means for handling the floats outside of the moat.

4. Manufacturing line according to claim 3, wherein said handling means are selected from an overhead rack, a crane and a pulley block.

5. Manufacturing line according to claim 1 or 2, wherein the moat of liquid is arranged so that the circuit followed by the floats is a closed loop, passing through the casting means and the removal means, the means for bringing back the floats to the casting means being constituted by a part of the moat itself.

6. Manufacturing line according to claim 5, wherein the moat of liquid is arranged so as to form a closed loop in a horizontal plane, the moat having two adjacent compartments in which the floats are moved in one direction in one compartment and in the opposite direction in the other compartment.

7. Manufacturing line according to claim 5, wherein the moat of liquid is arranged so as to form a closed loop in a vertical plane, this moat having a single compartment, the paths, in opposite directions, effected by the floats from the casting means to the removal means and then from the removal means back to the casting means being superimposed.

8. Manufacturing line according to claim 1 or 2, wherein the equilibrium of the floats in the moat is such that the concrete elements remain above the level of the liquid while moving through the hardening circuit and wherein the hardening circuit is constituted by at least a part of the moat having suitable heating means.

9. Manufacturing line according to claim 1 or 2, wherein the equilibrium of the floats, for at least a part of their movement, corresponding to the passage through the hardening circuit, is such that the floats are immersed with the concrete elements that they support, in the liquid of the moat, and means for heating this liquid progressively along the moat.

10. Manufacturing line according to claim 9, comprising means for heating the liquid of the moat formed by a network of super-heated water provided with connectors with automatic regulation of the flow rate according to the temperature desired in the respective area and including a network for sending back cooled water to the source, the two networks being placed in the same channel.

11. Manufacturing line according to claim 1 or 2, wherein the floats have a volume predetermined as a function of their weight and of the weight of the heaviest and lightest concrete elements to be transported, so that during the floating or immersion of the floats in the liquid of the moat, the gravitational force due to the heaviest products is equal to the lifting force obtained with the lightest products.

12. Manufacturing line according to claim 1 or 2, wherein the said casting means is arranged to ensure demolding of the elements, immediately after their casting, and the floats are formed by board-float on which the bare elements are deposited during the immediate unmolding.

13. Manufacturing line according to claim 12, wherein the casting means is arranged so as to ensure the closing of the molds by said board-floats, and the casting means comprise tilting means for tilting the molds for the demolding so that after tilting, the board-floats are below the molded elements, so as to support them, and means for lowering the board-floats into the liquid of the moat.

14. Manufacturing line according to claim 13, wherein the tilting means comprise a tilting frame arranged to tilt to 180° and comprising a fixing frame for the molds or batteries of molds on elastic studs, a gripping device for the board-floats on the molds after casting of the concrete into the molds and means for tilting the whole through 180°, so that the board-floats support the bare elements after unmolding.

15. Manufacturing line according to claim 13, wherein the tilting means comprise a tilting frame arranged to tilt through 90°, this frame comprising a framework provided with an axis of rotation, the tilting through 90° being actuated by jacks, and including a device for gripping and lowering the board-floats, this gripping device comprising a longitudinal support, guides and two synchronized jacks, the assembly being such that during the casting of the concrete, the board-float is gripped on the frame by forming a part of the mold, and after the tilting through 90°, by the operation of ungripping effected to the vertical, there is produced, at the same time, the unmolding and the lowering of the board-floats supporting the molded products into the liquid of the moat.

16. Manufacturing line according to claim 15, especially for the manufacture of elements with a "I" or "T" cross-section, wherein the mold is constituted by a bottom, by a vertical wall and by the board-float which is itself arranged with its element supporting surface parallel to and facing said vertical wall and gripped on its bottom, and including dismountable shelves fixable on the said wall and/or on the board-float.

17. Manufacturing line according to claim 12, wherein each board-float is made fluid-tight by the injection of a hydrophobic and light material and/or by means of one or several float elements, connected to a tray support for the bare products, said boards being provided with guide parts on their sides and buffers on their ends.

18. Manufacturing line according to claim 1 or 2, in which the concrete elements remain in the molds during the hardening, wherein the floats are formed by mold-carrying floats, on which are fixed the molds, these mold-carring floats being movable around the closed circuit so that the molds pass through the hardening circuit and are also acted upon by the casting means, the removal means and the returning means.

19. Manufacturing line according to claim 18, wherein each carrier-mold float comprises on the one hand float elements and assembly parts, for guiding and contact, and on the other hand, at least one working platform and support-molds provided with support and fixing parts, and with receiving parts for the vibration means.

20. Manufacturing line according to claim 19, wherein each carrier-mold float comprises receiving parts, formed by U profiles, provided beneath the support, for the vibration means, these vibration means being arranged to be fastened, during the vibration, to the mold support, these vibration means having a fixed position in the moat whereas the floats are movable in the longitudinal direction, the said vibration means being detached from the support and resting by rotary rollers, on the receiving parts as the float advances through the moat.

21. Manufacturing line according to claim 1 or 2, in which are provided lowering means, means for the immersion and exit of the floats, these means comprising elevator floats provided with connectors one for the filling of the elevator float with the liquid and the other for the evacuation of the liquid so as to cause the descent or the rise, respectively of the elevator-float.

22. Manufacturing line according to claim 1 or 2, mounted in a boat hull, so as to constitute a floating factory.

* * * * *